No. 675,740. Patented June 4, 1901.
A. KEEN.
LOCK NUT.
(Application filed Feb. 14, 1901.)
(No Model.)
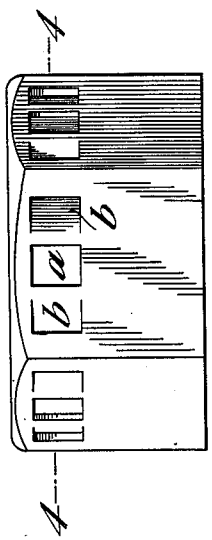
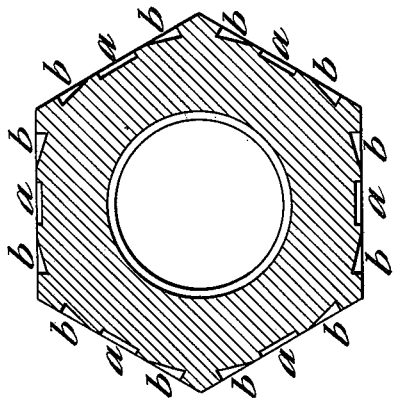
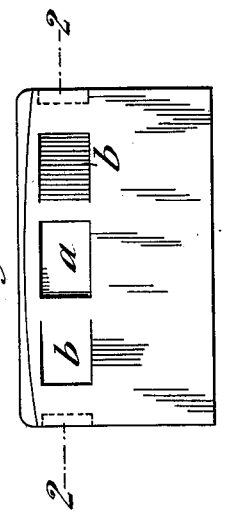
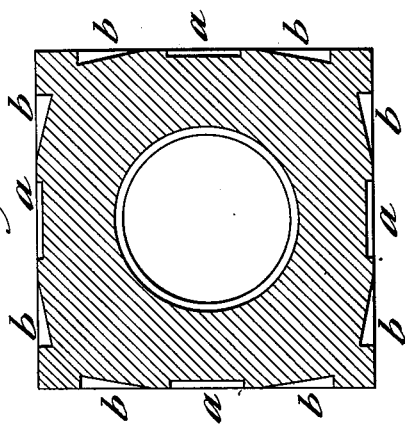
WITNESSES
INVENTOR

UNITED STATES PATENT OFFICE.

ARTHUR KEEN, OF SMETHWICK, ENGLAND.

LOCK-NUT.

SPECIFICATION forming part of Letters Patent No. 675,740, dated June 4, 1901.

Application filed February 14, 1901. Serial No. 47,278. (No model.)

*To all whom it may concern:*

Be it known that I, ARTHUR KEEN, a citizen of England, residing at London Works, Smethwick, near Birmingham, in the county of Warwick, England, have invented a certain new and useful Improvement in Lock-Nuts, (for which I have applied for a patent in Great Britain, dated July 17, 1900, No. 12,869,) of which the following is a specification.

In the British specification No. 10,396 of 1886 is described a method of locking nuts on bolts by slightly deforming by external blows or pressure part of the interior of the nut after it is screw-threaded, and thus causing that part of the thread which is deformed to grip the bolt on which the nut is screwed. It has been found in practice that owing to the deformation of the thread being produced only at several points of the circumference the locking effect becomes seriously lessened by repeated screwings and unscrewings.

My invention relates to a method of producing deformation of the nut-thread not merely at several points of the circumference of the thread, but uniformly, or nearly so, all around the circumference, so that practically at that part of the length of the nut where the deforming pressure is applied the nut-thread is somewhat reduced in diameter and grips the bolt-thread around its whole circumference. In order to effect deformation of this kind, I prepare dies, which are strongly pressed against the sides of the nut, forcing the metal inward at three places on each side of the nut, one place at the middle of the width of the side and one place near each angle. The die therefore presents on its face three rectangular protruding parts like very short punches, the middle part flat, the two side parts somewhat inclined on their faces, so as to press the metal next the corners of the nut a little more deeply inward than it is pressed elsewhere.

The effect of the three pressures applied to each side of the nut is to force the whole circumference of the thread a little inward, and thus a much greater surface of the nut-threads is brought into close contact with the bolt-threads than when the threads are in close contact only at a few points of the circumference. The locking effect due to the frictional resistance is thus made to endure for a long period, subsisting after frequent screwings and unscrewings.

Figure 1 of the accompanying drawings is a side elevation, and Fig. 2 is a sectional plan on the line 2 2 of Fig. 1, of a square nut treated according to this invention. Fig. 3 is an elevation, and Fig. 4 is a sectional plan on the line 4 4 of Fig. 3, of a hexagonal nut so treated.

On each side, as shown in the drawings, three recesses are punched in, the middle recess $a$ of uniform depth and each of the lateral recesses $b$ having a sloping bottom, its depth increasing toward the adjacent corners of the nut.

Having thus described the nature of my said invention and the best means I know of carrying the same into practical effect, I claim—

A lock-nut having recesses pressed in its outer flat faces which extend parallel with its bore, the portions of the recesses adjacent to the corners being of greater depth than those near the center of the faces, said recesses being arranged to force the thread portion of the nut inwardly to bind upon the threads of the bolt; substantially as described.

In testimony whereof I have hereunto set my hand in presence of two subscribing witnesses.

ARTHUR KEEN.

Witnesses:
 ALBERT G. KEEN,
 H. A. KEEN.